United States Patent

Takahashi et al.

Patent Number: 5,881,548
Date of Patent: Mar. 16, 1999

[54] CABLE DRAG CHAIN

[75] Inventors: Toshio Takahashi; Katsutoshi Shibayama; Tsutomu Iwami; Takayuki Matsuda, all of Osaka-fu, Japan

[73] Assignee: Tsubakimoto Chain Co., Japan

[21] Appl. No.: 949,231

[22] Filed: Oct. 13, 1997

[30] Foreign Application Priority Data

Oct. 16, 1996 [JP] Japan ................................ 8-273488
Aug. 11, 1997 [JP] Japan ................................ 9-216525

[51] Int. Cl.$^6$ .................................................. F16G 13/16
[52] U.S. Cl. ............................................. 59/78.1; 248/49
[58] Field of Search ................................. 59/78.1; 248/49

[56] References Cited

U.S. PATENT DOCUMENTS

| 4,833,876 | 5/1989 | Kitao et al. |
| 5,108,350 | 4/1992 | Szpakowski ............................ 50/78.1 |
| 5,174,104 | 12/1992 | Wehler et al. |
| 5,184,454 | 2/1993 | Klein et al. ............................. 59/78.1 |

FOREIGN PATENT DOCUMENTS

| 3522885 | 1/1987 | Germany ............................... 59/78.1 |
| 3709740 | 10/1988 | Germany ............................... 59/78.1 |
| 3929095 | 3/1991 | Germany ............................... 59/78.1 |
| 43 13 075 A1 | 4/1993 | Germany. |
| 52774 | 11/1991 | Japan. |

Primary Examiner—David Jones
Attorney, Agent, or Firm—Woodling, Krost & Rust

[57] ABSTRACT

A cable drag chain wherein a plurality of link members each comprising a pair of right and left side plates and connecting plates connecting upper and lower edges, respectively, of the side plates are connected together contiguously in a bendable manner, the connecting plates are to be connected strongly to the side plates. A cable drag chain 10 comprises a plurality of resinous link members 12 connected together contiguously in a bendable manner. Each link member 12 has a pair of right and left side plates 14, 16 and connecting plates 18, 20 which connect transversely upper and lower edges, respectively, of the side plates. A pair of connecting arms 22, 22 are projected at both ends of the connecting plate 18. A connecting arm receptacle portion 24 for receiving the connecting arms 22, 22 therein is formed in the upper edge of each side plate 14 (16) centrally in the longitudinal direction of the cable drag chain. Engaging pins 26 are projected from abutment surfaces of the connecting arms 22, 22, while engaging pin receptacle holes 28 are formed in abutment surfaces of the connecting arm receptacle portion 24. The engaging pin receptacle hole 28 is open sideways of the side plate 14 (16), but is closed at the upper edge of the side plate 14 (16), so that the connecting plate 18 is difficult to be disconnected above the side plates 14 and 16.

9 Claims, 10 Drawing Sheets

CABLE DRAG CHAIN

The present invention relates to a cable drag chain for protecting and guiding safely and surely such flexible members as cable and hose which feed energy to a movable machine.

PRIOR ART

In a cable drag chain, as described, for example, in German Patent Publication No. DE4313075A1 and Japanese Utility Model Publication No. 52774/91, a plurality of link members each comprising a pair of right and left side plates and connecting plates which connect upper and lower edges, respectively, of the side plates are connected contiguously in a bendable manner, and for receiving a cable, etc. in the interior of the link members, each connecting plate which connects the upper edges of the paired side plates transversely can be opened on both sides with respect to the paired right and left side plates.

PROBLEM TO BE SOLVED BY THE INVENTION

However, in the cable drag chain described in the former German patent publication, with engaging pins of the connecting plates fitted in guide grooves, the connecting plates are apt to be disengaged against external forces because the swing direction of the connecting plates and the engaging/disengaging direction of the engaging pins are the same. This is also true of the cable drag chain described in the latter Japanese utility model publication 52774/91.

Further, in each of such conventional cable drag chains, it is required that a connecting plate disconnecting tool be inserted sideways of each side plate when a connecting plate is to be removed from the side plate. In this case, if there is an interfering object such as a rail wall for example sideways of the cable drag chain, it is impossible to open or remove the connecting plate, and hence for the maintenance or replacement of cable or the like it is necessary to remove the whole of the cable drag chain. This is very inefficient.

MEANS FOR SOLVING THE PROBLEMS

The present invention has solved the above-mentioned problems by a cable drag chain wherein a plurality of link members each comprising a pair of right and left side plates and connecting plates which connect transversely upper and lower edges, respectively, of the side plates are connected together contiguously in a bendable manner, a pair of elastically deformable connecting arms spaced from each other in the longitudinal direction of the cable drag chain are projected at each end of at least one connecting plate, a connecting arm receptacle portion for receiving the connecting arms therein is recessed in each side plate, engaging pins are projected from abutment surfaces of either the connecting arms or the connecting arm receptacle portion in the longitudinal direction of the cable drag chain, while engaging pin receptacle holes are formed in the abutment surfaces of the other of the connecting arms and the connecting arm receptacle portion, the engaging pin receptacle holes being closed in a connecting plate disconnecting direction.

BRIEF DESCRIPTION OF THE DRAWINGS

FIG. 9(*a*) is a plan view of a connecting plate used in another embodiment of the present invention and 9(*b*) is a side view thereof;

EXPLANATION OF REFERENCE NUMERALS

10 . . . cable drag chain
12 . . . link member
14, 16, 62 . . . side plates
18, 20, 64 . . . connecting plates
22, 66 . . . connecting arms
24, 68 . . . connecting arm receptacle portions
26, 70 . . . engaging pins
28, 72 . . . engaging pin receptacle holes
30, 78 . . . engaging pin guide groove
42, 46, 88 . . . tool insertion ports
74 . . . engaging pin fitting groove
76 . . . connecting arm disengagement preventing stopper
80, 82 . . . inward fall correcting portions
84 . . . slit
86 . . . lug
90 . . . tool retaining surface Operation When the connecting arms of each connecting plate are pushed to the connecting arm receptacle portion of each side plate, the connecting arms, which are spaced apart from each other, are fitted into the receptacle portion while narrowing their spacing. Thereafter, the connecting arms expand, so that the engaging pins and the engaging pin receptacle holes come into concave-convex engagement with each other. Even if a force acting to disengage the connecting plate from the side plate is exerted on the connecting plate, as long as the engaging pins and the engaging pin receptacle holes both formed in longitudinal abutment surfaces of the cable drag chain are fitted together in concave-convex engagement, the engaging pins do not come off the engaging pin receptacle holes because the receptacle holes are closed in the connecting pin disconnecting direction. Thus, the connecting plate can be kept engaged with the side plate.

For easy concave-convex engagement of the engaging pins with the engaging pin receptacle holes it is preferable that the engaging pins be formed on the connecting arm-side abutment surfaces, while the engaging pin receptacle holes be formed in the receptacle portion-side abutment surfaces, and that engaging pin guide grooves which are inclined toward the receptacle portions be formed in the peripheral edge of each side plate. According to this construction, in assembling the connecting plates and the side plates, the engaging pins are positioned along the guide grooves, whereby the connecting arms are narrowed with respect to each other, and the connecting arms expand after guided into each receptacle portion, so that the engaging pins and the engaging pin receptacle holes are fitted together in concave-convex engagement.

There may be made a modification such that the engaging pins are formed on the receptacle portion-side abutment surface, while the engaging pin receptacle holes are formed in the connecting arm-side abutment surfaces, and an engaging pin guide groove inclined in a converging direction is formed in the lower surface of each connecting arm. Also in this case, the connecting arms are narrowed with respect to each other and expand after guided into each receptacle portion, so that the engaging pins and the engaging pin receptacle holes are fitted together in concave-convex engagement.

Preferably, there are formed engaging pin fitting grooves communicating with the engaging pin receptacle holes formed in each side plate, the engaging pin fitting grooves being open sideways of the side plate, and connecting arm disengagement preventing stoppers are projected from the bottom of the receptacle portion of the side plate, the stoppers being adapted to engage the connecting arms with engaging pins fitted in the engaging pin receptacle holes in concave-convex engagement. In mounting one end portion of each connecting plate to a side plate, the engaging pins formed on the connecting arms are guided into the engaging pin receptacle holes through the engaging pin fitting grooves formed in the side plate. Thereafter, the connecting plate is moved pivotally about the one end portion of the connecting plate and the other end of the connecting plate is mounted to the side plate.

After the engaging pins of the connecting arms have been fitted in the engaging pin receptacle holes formed in the side plate, the connecting arm disengagement preventing stoppers projected on the bottom of the receptacle portion of the side plate come into engagement with the connecting arms so that the connecting arms may not become disengaged easily from the side plate. Therefore, in connecting the other end of the connecting plate to the side plate after connecting one end thereof to the side plate, the connecting plate moves pivotally about the engaging pins without being disengaged from the side plate. Also when disengaging the other end of the connecting plate from the side plate and allowing it to swing about one end thereof, the connecting plate swings about the engaging pins without disengagement from the side plate.

Preferably, in order that each connecting plate can be removed from each side plate not only sideways of the side plate but also from above the connecting plate in the concave-convex fitted state of the engaging plates and the engaging pin receptacle holes, a connecting plate disconnecting tool insertion port, which opens sideways of the side plate, is formed in the connecting arm receptacle portion of the side plate, and a connecting plate disconnecting tool insertion port, which opens above the connecting arms, is formed by projecting the opposed surfaces of the connecting arms in a face-to-face relation to each other in the connecting plate. For the maintenance of cable, etc. it is necessary to disconnect each connecting plate, but according to the above construction, a connecting plate disconnecting tool can be inserted not only sideways of but also from above the cable drag chain.

Preferably, in order that each connecting plate can be removed easily from each side plate, a connecting plate disconnecting tool insertion port, which opens sides of the side plate, is formed in the connecting arm receptacle portion of the side plate, and the lower surface of each connecting arm opposed to the bottom of the connecting plate disconnecting tool insertion port is formed with a tool retaining surface which converges toward the bottom. When a tool is inserted sideways of the side plate into the connecting plate disconnecting tool insertion port to remove the connecting arms from the side plate, the paired connecting arms assume a lifted state from the bottom. In this case, the connecting arms are twisted in directions opposite to each other. Since the tool retaining surfaces formed on the undersides of the connecting arms converge toward the bottom, even if the connecting arms are twisted with respect to each other, a releasing force from the tool acts upward on the connecting arms.

Preferably, the connecting plates and the side plates are abutted each other at respective inward fall correcting surfaces on a central side in the transverse direction of the cable drag chain relative to the concave-convex fitting positions of the side plates and the connecting plates. According to this construction, prior to concave-convex engagement of the engaging pins and the engaging pin receptacle holes, the connecting plates and the side plates start mutual abutment at the respective inward fall correcting surfaces, so that even when the side plates fall inwards, their postures are corrected. Thus, at a proper posture of the side plates, the engaging pins can be smoothly fitted in the engaging pin receptacle holes.

Preferably, inward fall correcting portions are erected on the bottom of each connecting arm receptacle portion recessed in each side plate, opposed surfaces of the inward fall correcting portions are used as inward fall correcting surfaces, and each connecting plate and each side plate are abutted together at the inward fall correcting surfaces. Thus, by erecting the inward fall correcting portions in the connecting arm receptacle portion, inward fall of the side plate can be prevented by the connecting plate without projecting inward fall correcting portions inwards from the opposed sides of the right and left side plates. By so doing, it is possible to eliminate projections which would cause an obstacle to work, damage to inserted support members, or injury in the worker's hand at the time of inserting or removing a flexible member such as cable or hose into or from the inside of the cable drag chain.

Preferably, a slit is formed between the inward fall correcting portions to space the inward fall correcting portions away from each other in the longitudinal direction of the cable drag chain, and a projection for snap engagement with the slit is formed on each end of the connecting plate. As a result, when each connecting plate comes into engagement with the slit thus formed between the inner fall correcting portions, both ends of the connecting plate are positioned in the longitudinal direction of the cable drag chain and thereafter the engaging pins and the engaging pin receptacle holes are fitted together in concave-convex engagement. Thus, inward fall of the side plates is corrected and the connecting arms are positioned in the longitudinal direction of the cable drag chain. Therefore, the connecting arms are guided accurately to the engaged positions of the engaging pins and the engaging pin receptacle holes, thus facilitating the engagement between the connecting arms and the side plates. Once the connecting plate is thus connected to the side plates, it is prevented more surely from coming off the side plates in the actual use of the cable drag chain.

Embodiments

Figure 1:
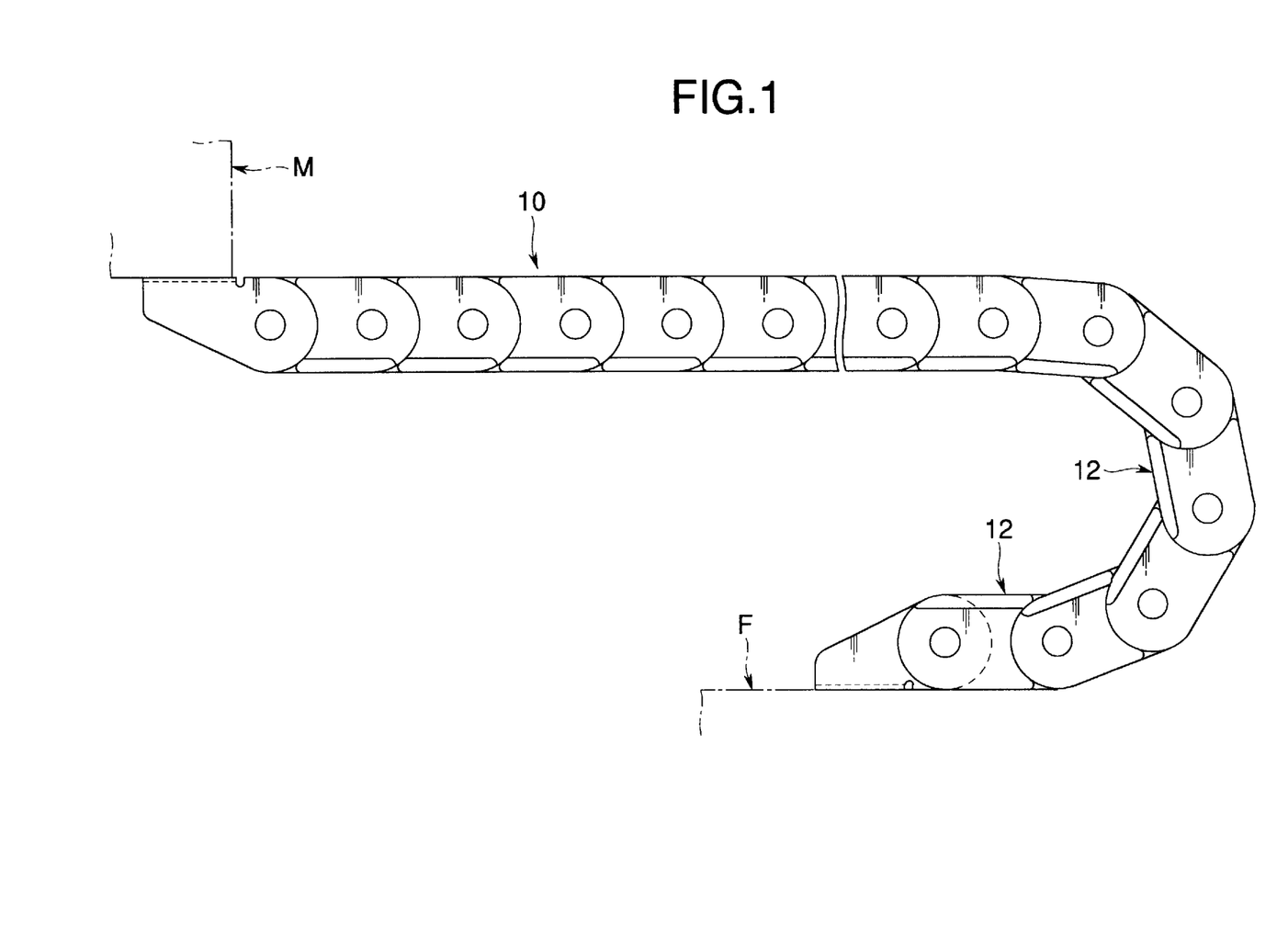
FIG. 1 is a front view of a cable drag chain embodying the present invention.
Figure 2:
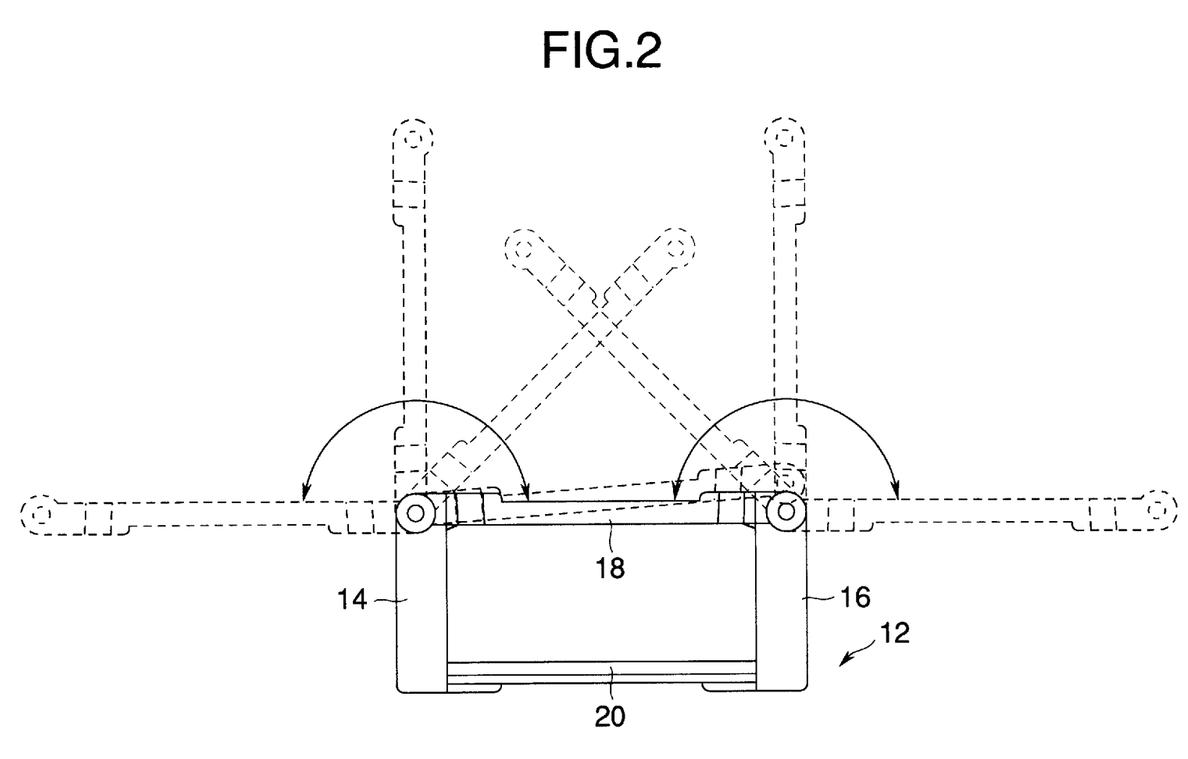
FIG. 2 is a side view of one link member.

A cable drag chain 10, as shown its whole in a front view of FIG. 1, comprises a plurality of resinous link members 12 connected together in a bendable manner. The cable drag chain 10 is for receiving therein and protecting cable and hose extending from a floor surface F to a motor M for example. As shown in FIG. 2, each link member 12 has a pair of right and left side plates 14, 16 and connecting plates 18, 20 which connect transversely upper and lower edges, respectively, of the side plates. The connecting plate 18 which connects transversely the upper edges of the side plates 14 and 16 can be connected disconnectably to the side plates. In a connected state to the side plate 14 or 16, the connecting plate 18 is movable pivotally with respect to the side plate. On the other hand, the connecting plate 20 which connects transversely the lower edges of the side plates 14 and 16 is formed integrally with the side plates. The lower edge connecting plate 20 can also be made disconnectable from the side plates 14 and 16.

Figure 3:
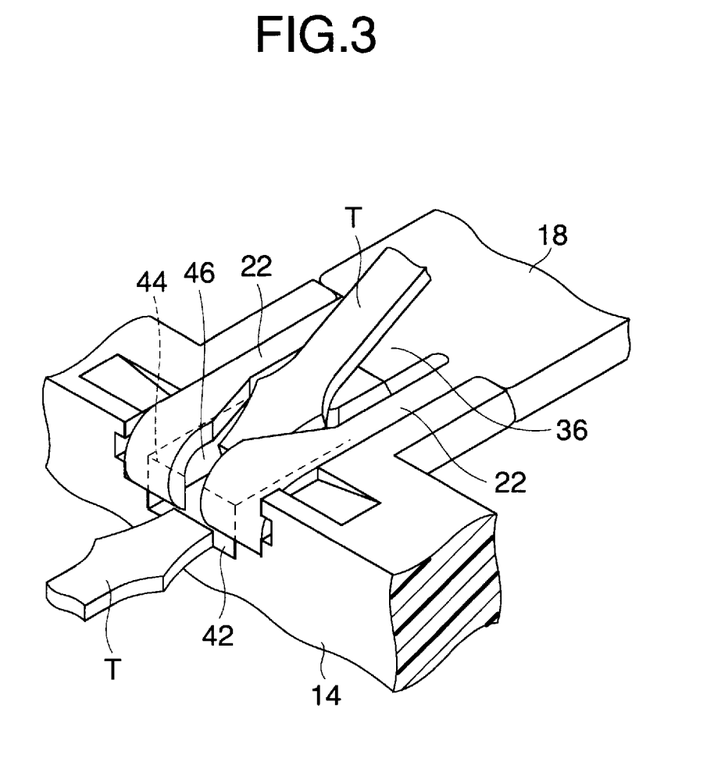
FIG. 3 is a perspective view of a principal portion of the link member.

As will be described in detail below, the side plates 14, 16 and the connecting plate 18 are connected together by concave-convex engagement of the engaging pins and the engaging pin receptacle holes. Disconnection of the connecting plate 18 is performed sideways of or from above the cable drag chain 10 with use of a connecting plate disconnecting tool T such as a driver for example, as shown in FIG. 3.

Figure 4:
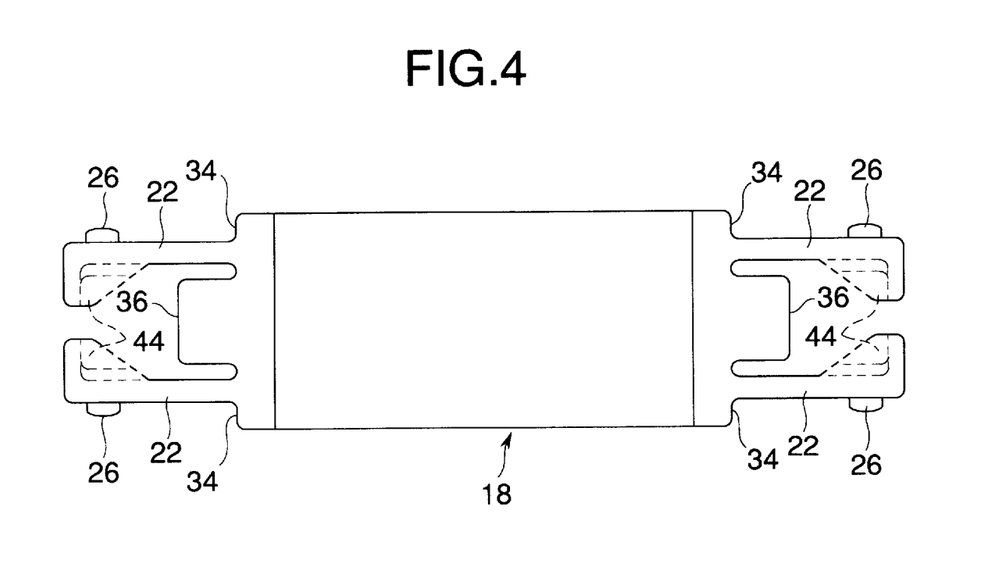
FIG. 4 is a plan view of a connecting plate.
Figure 5:
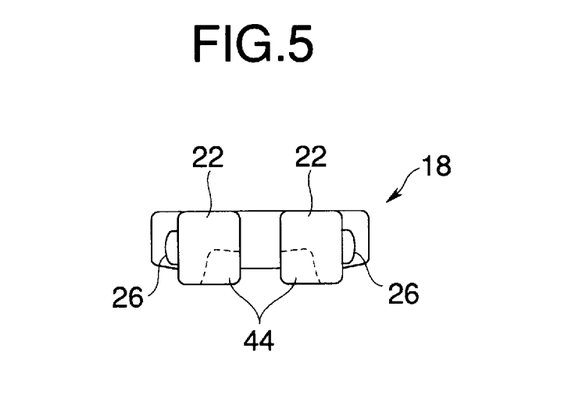
FIG. 5 is a front view of the connecting plate.
Figure 6:
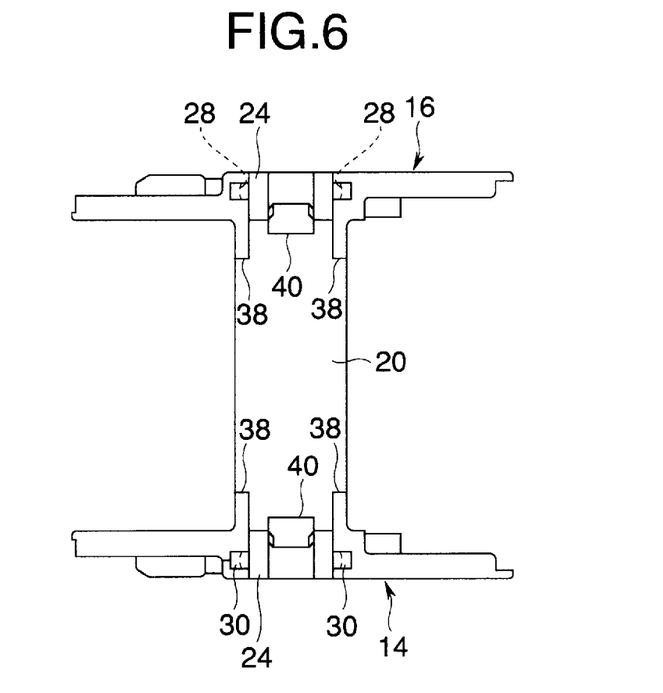
FIG. 6 is a plan view of the link member with an upper connecting plate removed.
Figure 7:
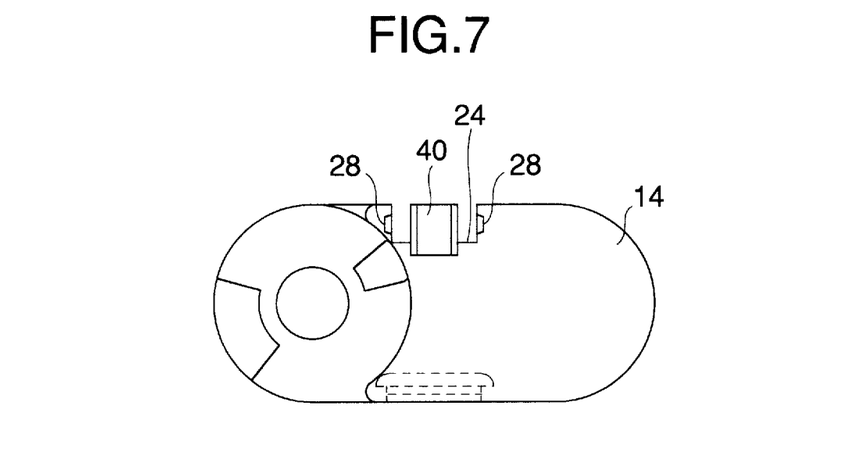
FIG. 7 is a front view thereof.

FIGS. 4 and 5 illustrate the connecting plate 18. A pair of connecting arms 22, 22 are projected from both ends of the connecting plate 18. On the other hand, in each of the side plates 14 and 16, as shown in FIGS. 6 and 7, a connecting arm receptacle portion 24 for receiving the connecting arms 22, 22 therein is recessed in the upper edge of the side plate centrally in the longitudinal direction of the cable drag chain. The connecting arms 22, 22 are in abutment with the receptacle portion 24 longitudinally of the cable drag chain. Engaging pins 26 are projected from the abutment surfaces of the connecting arms 22, 22, while engaging pin receptacle holes 28 are formed in the abutment surfaces of the receptacle portion 24.

The pin receptacle holes 28 are open sideways of the side plates 14 and 16, but are closed at the upper edges of the side plates 14 and 16, thus making it difficult for the connecting plate 18 to be disconnected above the side plates 14 and 16. Preferably, the side openings of the side plates 14 and 16 are slightly narrower than the diameter of each engaging pin 26 so that the engaging pin 26 does not easily come off the engaging pin receptacle hole 28 after concave-convex engagement of the two. According to this construction, when the engaging pin 22 is engaged with the engaging pin receptacle hole 24 at one end of the connecting plate 18, the connecting plate 18 is pivotable with respect to one side plate.

In the upper edge of the side plates 14 and 16 and at positions above the engaging pin receptacle holes 28 there are formed engaging pin guide grooves 30 which are inclined toward the receptacle portion 24. At one end of the connecting plate 18, after the engaging pins 26 of the connecting arms 22 are inserted from the side openings of the side plate 14 (16) into the engaging pin receptacle holes 28, or after the engaging pins 26 are inserted along the engaging pin guide grooves 30 formed in the side plate 14 (16), if the other end of the connecting plate 18 is pushed in from the upper edge of the other side plate, the connecting arms 22 get into the receptacle portion 24 while undergoing elastic deformation and narrowing the spacing of the two. When the engaging pins 26 are fitted orderly in the engaging pin receptacle holes 28, the connecting arms 22, 22 expand and now the connection of the connecting plate 18 with the side plates 14 and 16 is completed.

The side plates 14, 16 and the connecting plate 18 are transversely in abutment with each other at respective inward fall correcting surfaces on a central side relative to the concave-concave fitting positions of the engaging pins 26 and the engaging pin receptacle holes 28. Inward fall correcting surfaces of the connecting plate 18 are formed at a pair of shoulder portions 34, 34 located outside the connecting arms 22 and also at a front end of a projecting portion 36 formed between the connecting arms 22. On the other hand, inward fall correcting surfaces of the side plates 14 and 16 are formed at front ends of a pair of connecting arm holding arms 38, 38 projected in a face-to-face relation to each other and are also formed at projecting portions 40 projecting upward from the respective receptacle portions 24. The inward fall correcting surfaces of the shoulder portions 34, 34 and the projecting portion 36 form a shape which permits their contact with the connecting arm holding arms 38, 38 and the projecting portion 40 and permits rotation about the engaging pins 26. Only the shoulder portions 34, 34 and the connecting arm holding arms 38, 38 may be abutted with each other, or only the projecting portions 36 and 40 may be abutted with each other.

The inward fall correcting surfaces of the side plates 14, 16 and those of the connecting plate 18 come into abutment with each other, whereby even if the side plates 14 and 16 fall inwards, their postures can be corrected. Thus, when the connecting arms 22 are fitted in the receptacle portion 24, first the inward fall correcting surfaces come into abutment with each other and thereafter the engaging pins 26 are fitted in the engaging pin receptacle holes 28 along the engaging pin guide grooves 30. In this case, since the positioning of the engaging pins 26 and the engaging pin receptacle holes 28 is conducted in advance, even in the case of connecting plural connecting plates 18 to the side plates 14 and 16, the connection can be done quickly.

The following description is now provided about a construction for disconnecting the connecting plate 18. In the cable drag chain 10 of the present invention, as shown in FIG. 3, the connecting plate 18 can be disconnected sideways of and from above the link member 12. To this end, in the receptacle portion 24 of each of the side plates 14 and 16 there is formed a tool insertion port 42 which opens sideways of the side plate. Further, on the front end side with respect to the projecting portion 36 the connecting arms 22 are projected in a face-to-face relation to each other, and cut-in portions 44 are formed on the back side, to define a tool insertion port 46 which opens above the connecting arms 22.

For disconnecting the connecting plate 18 sideways of the cable drag chain 10, a tool is inserted into the tool insertion port 42 which opens sideways, whereby the connecting arms 22 undergo an elastic deformation and the engaging pins 26 get out of the engaging pin receptacle holes 28, so that the connecting plate 18 is disengaged at one end thereof from the side plate. On the other hand, for disconnecting the connecting plate 18 from above the cable drag chain 10, a tool is inserted into the cut-in portions 44 from the tool insertion port 46 which opens upward and is then twisted or pivoted with the projecting portion 40 as fulcrum, with the result that the connecting arms 22 are deformed elastically, the engaging pins 26 get out of the engaging pin receptacle holes 28, and the connecting plate 18 is disengaged at one end thereof from the side plate. Thus, even in the case where a rail wall is located sideways of the cable drag chain 10, the connecting plate 18 can be removed also from above the cable drag chain 10.

Figure 8:
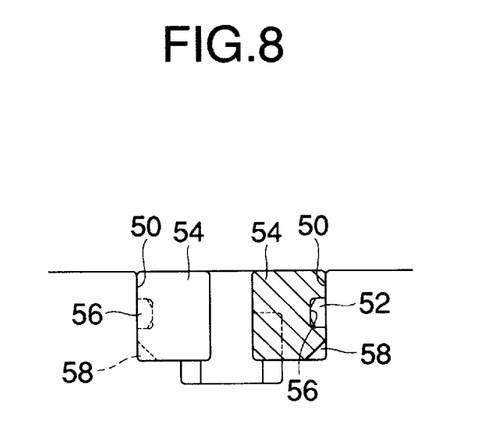
FIG. 8 is a front view of a principal portion of a cable drag chain according to a modification of the above embodiment, showing a different concave-convex engagement between a connecting plate and a connecting arm receptacle portion.

Although in the cable drag chain 10 of the above embodiment wherein the engaging pins 26 are formed on the connecting arms 22 and the engaging pin receptacle holes 28 are formed in the receptacle portion 24, a modification may be made such that, as shown in FIG. 8, engaging pins 52 are formed on abutment surfaces of a receptacle portion 50, engaging pin receptacle holes 56 are formed in abutment surfaces of connecting arms 54, and engaging pin guide grooves 58 each inclined toward a converging direction are formed in the lower surfaces of the connecting arms. According to this construction, the connecting arms 54, 54 are press-fitted into the receptacle portion 50 while narrowing their spacing.

Figure 9A:
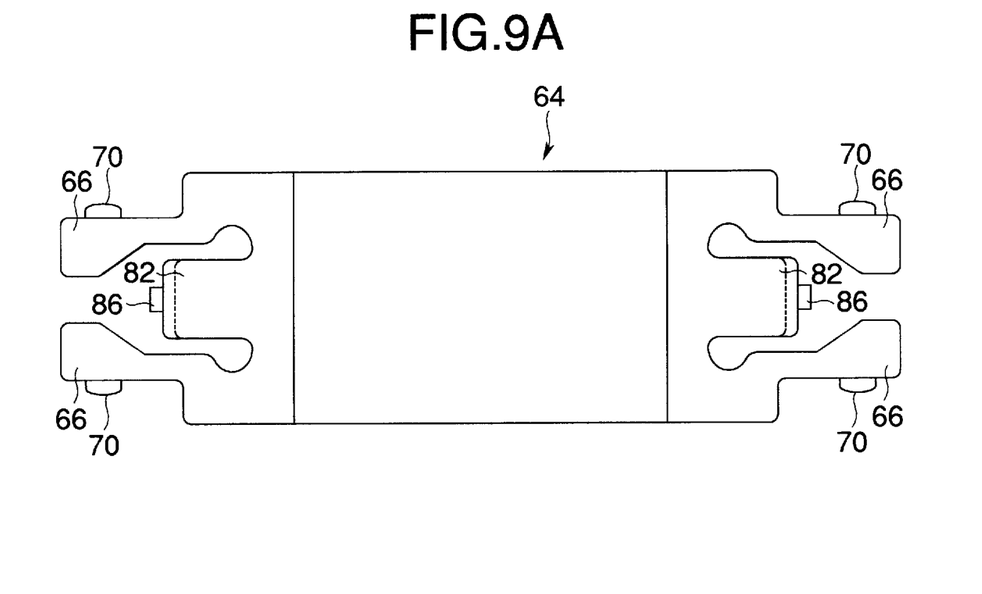
Figure 9B:
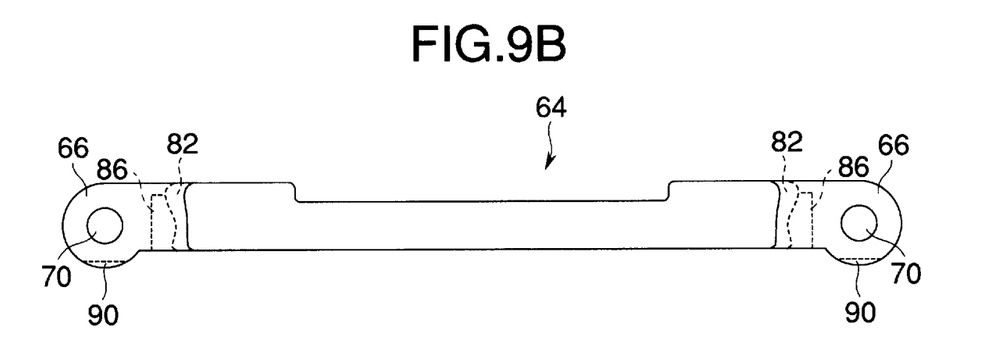
Figure 10:
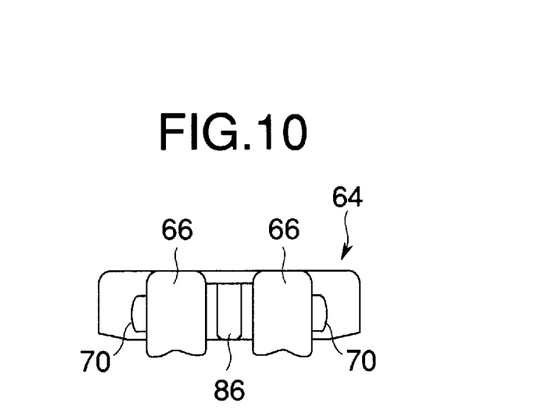
FIG. 10 is a front view of the connecting plate shown in FIG. 9.
Figure 11:
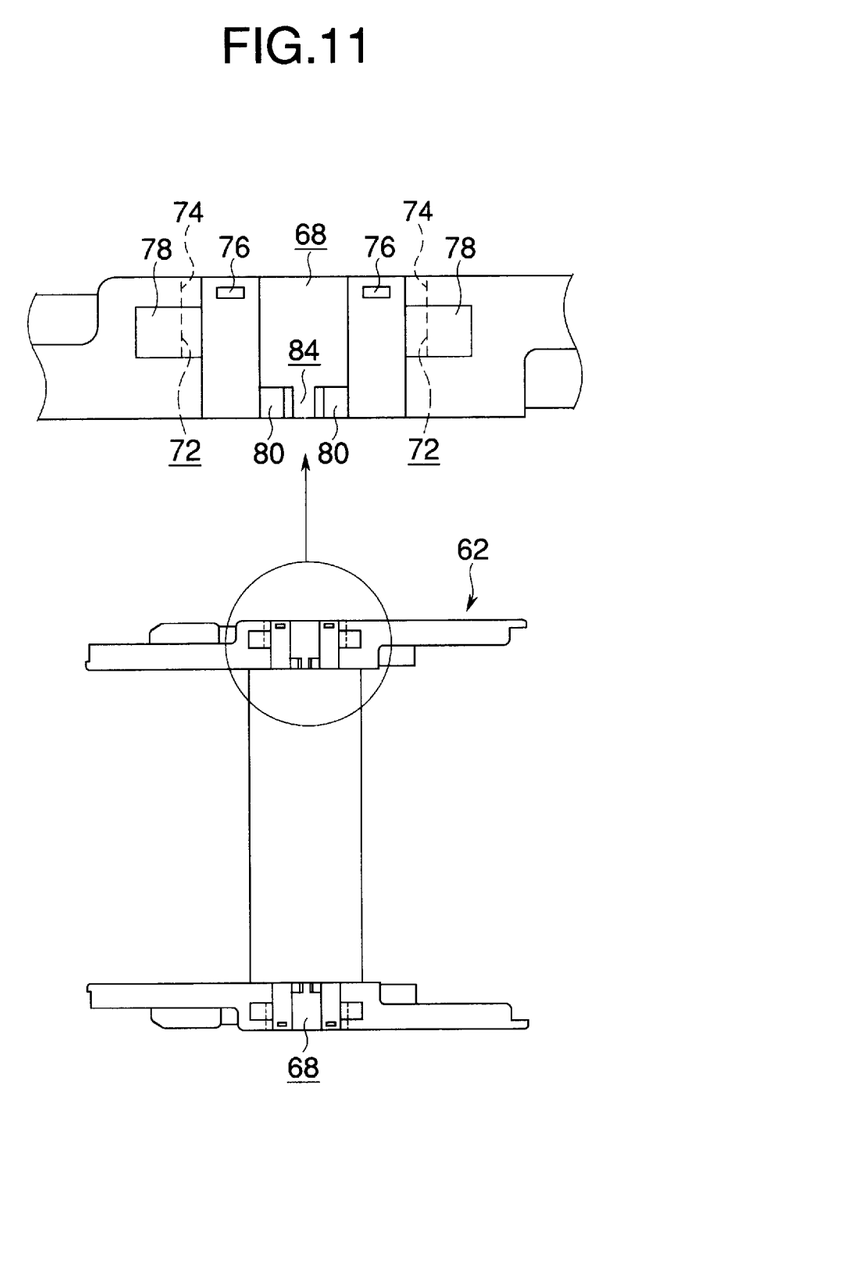
FIG. 11 is a plan view of a side plate used in the embodiment shown in FIG. 9.
Figure 12:
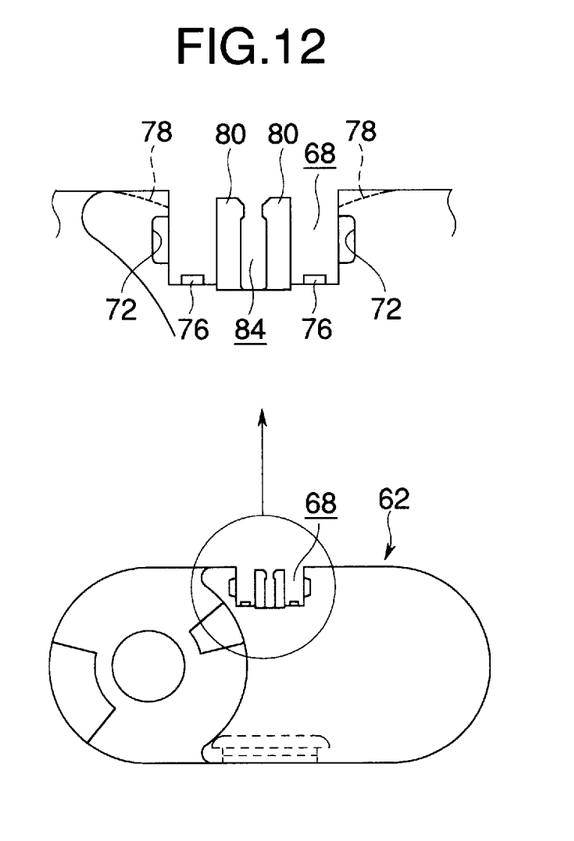
FIG. 12 is a front view thereof.
Figure 13:
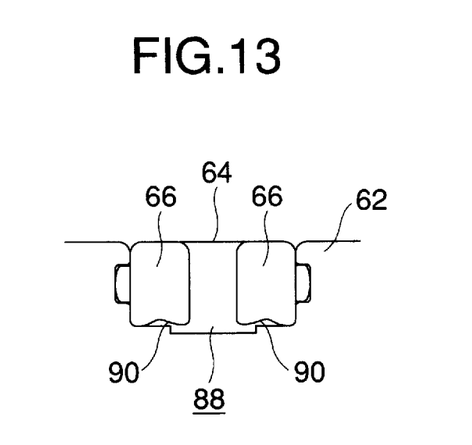
FIG. 13 is a front view showing a state of concave-convex engagement between the side plate and the connecting plate both used as constituents of a link member.
Figure 14:
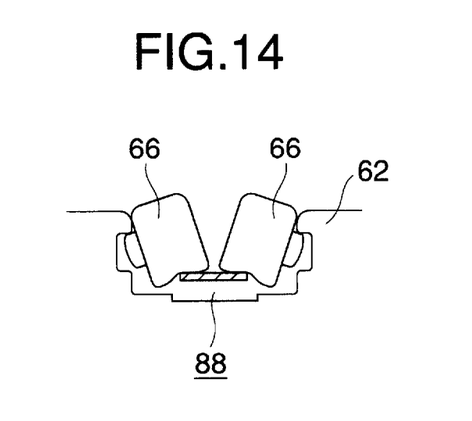
FIG. 14 is a front view showing a state in which the connecting plate is disconnected from the side plate with a tool inserted into the link member illustrated in FIG. 13.

FIGS. 9 to 14 illustrate a cable drag chain according to another embodiment of the present invention, of which FIGS. 9 and 10 illustrate a connecting plate, FIGS. 11 and 12 illustrate a side plate, and FIGS. 13 and 14 illustrate a connected state of the connecting plate to the side plate. The cable drag chain comprises link members connected together contiguously in a bendable manner, the link members each having a pair of right and left side plates 62, 62 and a connecting plate 64 which connects the upper edges of the side plates 62, 62 transversely. The lower edges of the side plates 62, 62 are connected with each other through another connecting plate (not shown).

As shown in FIGS. 9 and 10, a pair of connecting arms 66, 66 are projected at each end of the connecting plate 64. On the other hand, as shown in FIGS. 11 and 12, a connecting arm receptacle portion 68 for receiving the connecting arms 66 therein is recessed in the upper edge of each side plate 62 centrally in the longitudinal direction of the cable drag chain. The connecting arms 66, 66 are abutted with the receptacle portion 68 longitudinally of the cable drag chain. Engaging pins 70 are projected from the abutment surfaces of the connecting arms 66, while engaging pin receptacle holes 72 are formed in the abutment surfaces of the receptacle portion 68.

The engaging pin receptacle holes 72 are open sideways of the side plate 62 through engaging pin fitting grooves 74. However, the holes 72 close the upper edge of the side plate 62. Thus, once the engaging pins 70 are guided into the engaging pin receptacle holes 72 through the engaging pin fitting grooves 74, the connecting plate 64 is difficult to be disconnected above the side plates 62, 62.

Connecting arm disengagement preventing stoppers 76 are projected from the bottom of the connecting arm receptacle portion 68 at more sideways positions of each side plate than the engaging pin receptacle holes 72. When the engaging pins 70 are inserted into the engaging pin receptacle holes 72 sideways of the side plate 62, front ends of the connecting arms 66 get over the stoppers 76. With the engaging pins 70 inserted into the engaging pin receptacle holes 72, the connecting arms 66 are pivotable about the engaging pins 70 without disengagement from the side plate 62.

Engaging pin guide grooves 78 inclined toward the receptacle portion 68 are formed in the upper edge of each side plate 62 and above the engaging pin receptacle holes 72. When the other end of the connecting plate 64 whose one end has been connected to one side plate 62 is pushed in from the upper edge of the other side plate 62, the connecting arms 66, 66 are deformed elastically and get into the receptacle portion 68 while narrowing their spacing.

In this embodiment, inward fall correction portions 80 projected upward from the bottom of the receptacle portion 68 of each side plate 62, and between the connecting arms 66, 66 of the connecting plate 64 is projected an inward fall correcting portion 82 which comes into abutment with the inward fall correcting portions 80. The inward fall correcting portions 80 are formed in the wall thickness of the receptacle portion 68 and are not projecting into the inner support space of the cable drag chain. Thus, there is no protrusion that would cause an obstacle to work, damage to inserted support members, or injury in the worker's hand, at the time of inserting or removing a flexible member such as cable or hose into or from the interior of the cable drag chain.

The paired inward fall correcting portions 80 of each side plate are spaced apart in the longitudinal direction of the cable drag chain and a slit 84 is formed therebetween. The inward fall correcting portion 80 is formed equal to the spacing between the paired connecting arms 66, 66 of the connecting plate 64.

The inward fall correcting portion 82 of the connecting plate 64 is formed equal to the spacing between the inward fall correcting portions 80, 80 of each side plate 62, and the front end of each inward fall correcting portion 82 of the connecting plate 64 is inclined toward the inner support space of the cable drag chain. The inward fall correcting portions 82, 82 of the connecting plate 64 are centrally provided with a positioning lug 86 for concave-convex engagement with the slit 84. The positioning lug 86 is inclined so that both faces converge at the lower end of the lug.

When the connecting plate 64 connected at one end thereof to one side plate 62 is connected to the other side plate 62, the lug 86 of the inward fall correcting portion 82 shorter than the connecting arms 66 gets into the slit 84 and the paired connecting arms 66, 66 sandwich the inward fall correcting portions 80 of the side plate 62 therebetween, whereby the side plate 62 and the connecting plate 64 are positioned in the longitudinal direction of the cable drag chain. As the lug 86 gets into the slit 84, the inward fall correcting portion 82 of the connecting plate comes into abutment with the inward fall correcting portions 80 of the side plate, whereby the side plate 62 and the connecting plate 64 are positioned also in the transverse direction of the cable drag chain. Even in the event of inward fall of the paired side walls 62, 62, the inward fall is corrected by connecting the connecting plate 64 to the side plates 62, 62. Since the connecting plate 64 is connected by concave-convex engagement with each side plate 62, the prevention of its dislodgment is enhanced.

Also in this embodiment, like the previous embodiment, connecting plate disconnecting tool insertion ports are formed above and sideways of the cable drag chain so that the connecting plate can be removed in two directions. Particularly, as shown in FIGS. 13 and 14, tool retaining surfaces 90, 90 are formed on the front end undersides of the connecting arms 66, 66 of the connecting plate 64. The tool retaining surfaces 90, 90 converge toward the bottom of a sideways, connecting plate disconnecting tool insertion port 88. When the front ends of the connecting arms 66, 66 are lifted upward with a tool such as a driver or the like inserted into the tool insertion port 88, the right-hand and left-hand connecting arms 66 twisted clockwise and counterclockwise, respectively. Even in this state, the tool retaining surfaces 90, 90 are substantially parallel to the bottom and the disconnecting force of the tool acts upward. For the maintenance of cable or the like located in the inner support space of the cable drag chain it is necessary to remove the connecting plates of many link members. But the tool retaining surfaces on the front end undersides of the connecting arms permit the connecting plate disconnecting work to be done efficiently.

Effects of the Invention

According to the invention elastically deformable connecting arms are projected at both ends of a connecting plate, while a connecting arm receptacle portion is recessed in each side plate, and engaging pins and engaging pin receptacle holes are formed on abutment surfaces in the longitudinal direction of the cable drag chain, the engaging pin receptacle holes being closed in the connecting plate disconnecting direction. Therefore, even when a force acting to disconnect the connecting plate from each side plate is exerted on the connecting plate, it is possible to keep the connecting plate connected to the side plate and surely protect cable and hose because the disconnecting direction of the connecting plate from the side plate and the disengaging direction of the engaging pins from the engaging pin receptacle holes are different.

According to the invention engaging pins are formed on abutment surfaces of the connecting arms, engaging pin receptacle holes are formed in abutment surfaces of the connecting arm receptacle portion, and engaging pin guide grooves inclined toward the receptacle portion are formed in the peripheral edge of the side plate. Therefore, when the connecting arms with the engaging pins are press-fitted into the connecting arm receptacle portion, the engaging pins are guided by the engaging pin guide grooves and the connecting arms are deformed while narrowing their spacing and are smoothly fitted into the receptacle portion. Thus, plural connecting plates can be connected successively to the side plates.

Further, since the engaging pins are formed on the connecting arms of the connecting plate, even if the mounting and removal of the connecting plate to and from the side plates are repeated, resulting in wear of the engaging pins, the maintenance of the cable drag chain can be effected by only replacing the connecting plate with new one. This is advantageous in point of both the number of working steps and economy in comparison with the case where the whole of the link member must be replaced with new one.

According to the invention engaging pins are formed on the receptacle portion-side abutment surfaces, while engaging pin receptacle holes are formed in the connecting arm-side abutment surfaces, and an engaging pin guide groove inclined toward a converging direction is formed in the underside of each connecting arm. Therefore, as is the case with the invention of claim 2, when the connecting arms are press-fitted into the connecting arm receptacle portion, the connecting arms are deformed while narrowing their spacing and are smoothly fitted into the receptacle portion, thus permitting plural connecting plates to be connected successively to each side plate.

According to the invention since engaging pins formed on the connecting arms of the connecting plate can be guided into engaging pin receptacle grooves sideways of each side plate through engaging pin fitting grooves formed in the side plate, it becomes easy to connect one side of the connecting plate to the side plate.

Further, with the engaging pins fitted in the engaging pin receptacle holes, connecting arm disengagement preventing stopper projected from the bottom of the receptacle portion comes into engagement with the connecting arms, so that the connecting plate connected at one end thereof to the side plate swings in the fitted state of the engaging pins into the engaging pin receptacle holes and is not disconnected easily from the side plate. Thus, the connecting plate connected at one end thereof to one side plate and about to be connected at the other end thereof to the other side plate, or the connecting plate disconnected only at the other end thereof from the other side plate, can swing while being held at one end thereof by the one side plate. Therefore, not only the mounting of the connecting plate can be done smoothly but also the inspection of support members located inside the cable drag chain can be done easily by removing the connecting plate at the other end thereof.

According to the invention not only a connecting plate disconnecting tool insertion port which opens sideways of each side plate is formed in the connecting arm receptacle portion, but also a connecting plate disconnecting tool insertion port is formed so as to open above the connecting arms. Therefore, when the engaging pins and the engaging pin receptacle holes are fitted together in concave-convex engagement and the connecting plate is to be removed in this state, the tool can be inserted sideways of or above the cable drag chain. Thus, at the time of maintenance or replacement of cable or hose, even if a rail wall or any other member is located around the cable drag chain, the worker can remove the connecting plate in a direction convenient to the work. In this way the maintenance work can be done in an extremely efficient manner irrespective of how the cable drag chain is installed.

According to the invention a connecting plate disconnecting tool insertion port which opens sideways of each side plate is formed in the connecting plate receptacle portion, and a tool retaining surface is formed on the underside of each connecting arm opposed to the bottom of the connecting plate disconnecting tool insertion port, the tool retaining surface converging toward the bottom. Therefore, it becomes easy to disengage the connecting arms. More specifically, when the tool is inserted into the connecting plate disconnecting insertion port and an attempt is made to disengage the connecting arms from the side plate, the connecting arms are twisted in directions opposite to each other, but the tool retaining surfaces converging toward the bottom of the connecting plate disconnecting tool insertion port cause an upward force of the tool to act efficiently on the connecting arms. Consequently, the work for disengaging the engaging pins of the connecting arms from the engaging pin receptacle holes formed in the side plate becomes easier and hence it is easy to disassemble the cable drag chain and effect maintenance of internal support members.

Accordingly to the invention since the connecting plate and each side plate are abutted each other at respective inward fall correcting surfaces on a central side in the transverse direction of the cable drag chain relative to the concave-convex fitting positions of the side plate and the connecting plate, both plates come into abutment with each other at their abutment surfaces prior to concave-convex engagement of the engaging pins and the engaging pin receptacle holes, whereby positioning is effected for the concave-convex engagement of the engaging pins and the engaging pin receptacle holes. Therefore, even in the event side plates undergo an inward fall deformation, a plurality of connecting plates can be connected to the side plates quickly.

According to the invention inward fall correcting portions having inward fall correcting surfaces are formed on the bottom of the connecting arm receptacle portion of each side plate and the inward fall correcting portions can be formed within the wall thickness of the side plate, so it is possible to eliminate protrusions in the interior of the cable drag chain formed between the opposed faces of the side plates and thereby ensure protection and safety of the worker and prevent damage of support members located inside the chain.

According to the invention since a lug formed on the connecting plate side is brought into snap-engagement with a slit formed on each side plate side, not only inward fall of the side plates is corrected, but also the connecting plate is positioned in the longitudinal direction of the cable drag chain and its connecting arms are guided into the connecting arm receptacle portion of each side plate. Thus, concave-convex engagement of the engaging pins and the engaging pin receptacle holes becomes easy and assembling of the cable drag chain can be done efficiently. Besides, when the cable drag chain is used actually, the connecting plate can be prevented more surely from coming off the side plates.

The preceding description of the invention has been set forth by way of example only and it will be readily understood by those skilled in the art that modifications and changes to the embodiments set forth above can and will be made without deviating from the spirit and scope of the invention as set forth in the following claims.

We claim:

1. In a cable drag chain which includes a plurality of link members; said link members each include: a right side plate, a left side plate, an upper connecting plate, and a lower connecting plate; said link members being connected together contiguously in a bendable manner; the improvement characterized in that:

said upper connecting plate includes a first end portion and a second end portion; a first pair of elastically deformable connecting arms spaced from each other formed at said first end portion of said connecting plate and a second pair of elastically deformable connecting arms spaced from each other formed at said second end portion of said connecting plate;

each of said connecting arms includes engaging pins;

each of said left and right plates includes a connecting arm receptacle portion for receiving said engaging pins of said first and second pairs of elastically deformable connecting arms of said connecting plate;

and, each of said connecting arm receptacle portions of said side plates includes engaging pin guide grooves and connecting arm disengagement stoppers.

2. In a cable drag chain as claimed in claim 1 further including engaging pin receptacle holes in each of said connecting arm receptacle portions of said left side plate and said right side plate.

3. In cable drag chain according to claim 1 wherein said upper and lower connecting plates abut said left and right side plates so as to eliminate protrusions in the interior of the cable drag chain formed between said upper and lower connecting plates and said side plates.

4. A cable drag chain as claimed in claim 1 wherein each connecting arm receptacle portion includes an inward fall correcting portion and each side plate includes an inward fall correcting portion; each inward fall correcting portion of each side plate includes a first member and a second member, said first and said second member separated apart each from the other forming a slit therebetween; and, each inward face connecting arm receptacle portion includes a projection for engagement with said slit of said inward fall correcting portion of said side plate.

5. In a cable drag chain which includes a plurality of resinous link members; said link members each include: a right side plate, a left side plate, an upper connecting plate, and a lower connecting plate; staid link members being connected together contiguously in a bendable manner; the improvement characterized in that:

said upper connecting plate includes a first end portion and a second end portion; a first pair of elastically deformable connecting arms spaced from each other formed at said first end portion of said connecting plate and a second pair of elastically deformable connecting arms spaced from each other formed at said second end portion of said connecting plate;

each of said connecting arms includes concave holes and engaging pin guide grooves;

and, each of said left and right plates includes a connecting arm receptacle portion which includes convex engaging pins which mate with said concave holes of said elastically deformable connecting arms of said connecting plate.

6. In a cable drag chain as claimed in claim 5 wherein each of said connecting arm receptacle portions includes a disengagement stopper.

7. A cable drag chain as claimed in claim 5 wherein each connecting arm receptacle portion includes an inward fall correcting portion and each side plate includes an inward fall correcting portion; each inward fall correcting portion of each side plate includes a first member and a second member, said first and said second member separated apart each from the other forming a slit therebetween; and, each inward face connecting arm receptacle portion includes a projection for engagement with said slit of said inward fall correcting portion of said side plate.

8. A cable drag chain according to any of claims 1, 2, 6 or 3, wherein said right and left plates each include a first connecting plate disconnecting tool insertion port formed in said connecting arm receptacle portion of said side plates, and a second connecting plate disconnecting tool insertion port formed in said connecting arms allowing the projection of said connecting arms in a face-to-face relation to each other.

9. A cable drag chain according to any of claims 1, 2, 6 or 3 wherein said right and left plates each include a first connecting plate disconnecting tool insertion port formed in said connecting arm receptacle portion of said side plates, said connecting arms each include a lower surface facing said first connecting plate disconnecting tool insertion port, and, said lower surface of said connecting arms converges toward said first connecting plate disconnecting tool insertion port.

* * * * *

UNITED STATES PATENT AND TRADEMARK OFFICE
CERTIFICATE OF CORRECTION

PATENT NO. : 5,881,548
DATED : March 16, 1999
INVENTOR(S) : Toshio Takahashi, et al.

It is certified that error appears in the above-identified patent and that said Letters Patent is hereby corrected as shown below:

Col. 12 line 8, after "plate;", delete "staid", and insert -- said --.

Signed and Sealed this

Twenty-seventh Day of July, 1999

Attest:

Q. TODD DICKINSON

*Attesting Officer*         *Acting Commissioner of Patents and Trademarks*